2 Sheets--Sheet 1.

WILLIAM J. KEEP.

Improvement in Base-Burning Stoves.

No. 4,386. Reissued May 16, 1871.

Witnesses.

A. Edel Merle

J. H. Poole.

Inventor.

Wm. J. Keep, by Prindle and Dyer, Attys.

AM. PHOTO-LITHOGRAPHIC CO. N. Y. (OSBORNE'S PROCESS.)

2 Sheets--Sheet 2.

WILLIAM J. KEEP.

Improvement in Base-Burning Stoves.

No. 4,386. Reissued May 16, 1871.

Witnesses.

A. L. Merle

C. H. Poole

Inventor.

Wm. J. Keep, by Prindle and Dyer, Attys.

AM. PHOTO-LITHOGRAPHIC CO. N.Y. (OSBORNE'S PROCESS.)

United States Patent Office.

WILLIAM J. KEEP, OF TROY, NEW YORK.

Letters Patent No. 101,368, dated March 29, 1870; reissue No. 4,386, dated May 16, 1871.

IMPROVEMENT IN BASE-BURNING STOVES.

The Schedule referred to in these Letters Patent and making part of the same.

*To all whom it may concern:*

Be it known that I, WILLIAM J. KEEP, of Troy, in the county of Rensselaer and in the State of New York, have invented certain new and useful Improvements in Base-Burning Stoves; and do hereby declare that the following is a full, clear, and exact description thereof, reference being had to the accompanying drawing making a part of this specification, in which—

Letters of like name and kind refer to like parts in each of the figures.

Figure 1:
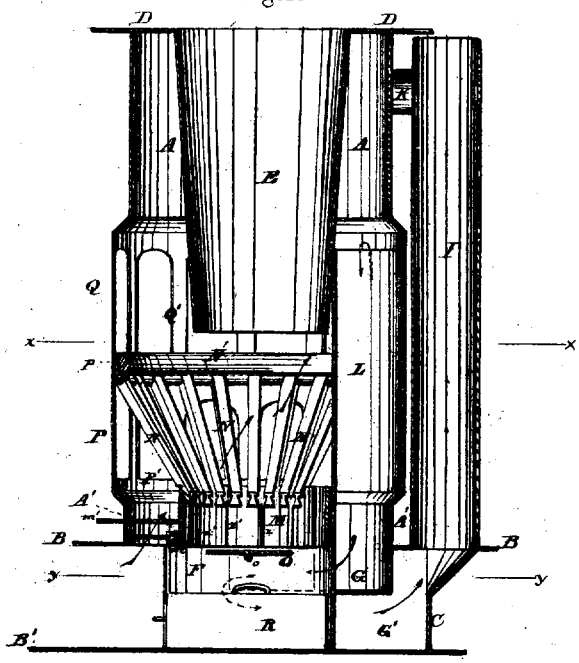
Figure 1 is a vertical central section of my stove.
Figure 2:
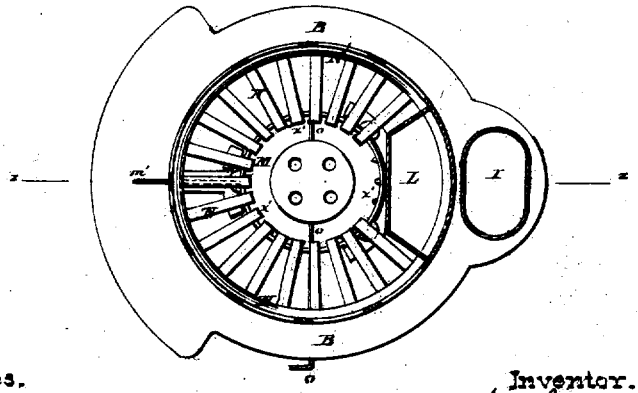
Figures 2 and 3 are horizontal sections of the same on the lines *x* and *y*, respectively, of fig. 1.

In base-burning stoves, as ordinarily constructed, the weight of the coal in the magazine tends to press the contents of the fuel-chamber into so compact a mass as to prevent the free entrance of air, and thereby render it difficult to secure a bright, lively fire.

Another serious objection arises from the difficulty that exists in securing a sufficient supply of air to such coal as is upon the outside or in immediate contact with the fuel-chamber, as when the grate is shaken or raked the friction upon the sides of said chamber is sufficient to cause the ashes to remain thereon, and not only obstruct the passage of air, but also, being a non-conductor of heat, prevent the radiation of the same through the walls of said chamber.

To obviate these and other objections is the design of my invention, which consists, principally, in a fuel-chamber or fire-pot having grated sides, a solid ring at its lower end, and a horizontal grate placed within or immediately beneath the latter, so that slate, slag, and ashes may be contained within said ring and upon said horizontal grate, substantially as and for the purpose hereinafter specified.

It further consists in a fuel-chamber or fire-pot having its sides composed of a series of bars so pivoted at their ends as to permit the sides of said chamber to move in a horizontal plane, substantially as hereinafter set forth.

It further consists in the employment of a downward flue situated at the rear of the fuel-chamber, and within the outer casing of the stove, substantially as hereinafter shown, and for the purpose specified.

It further consists in a fuel-chamber or fire-pot composed of a basket-grate, a solid lower end, and a horizontal grate, when arranged substantially as and for the purpose hereinafter shown.

It further consists in so combining the said solid ring with the side grate-bars as that motion given to one shall be communicated to the other, as is hereinafter shown and described.

It further consists in the means employed for giving a reciprocating motion to the pivoted bars composing the sides of the fuel-chamber or fire-pot, substantially as is hereinafter shown, and for the purpose set forth.

It further consists in combining with the horizontally-moving ring forming the lower end of the fuel-chamber or fire-pot a vertically-revolving grate, substantially as and for the purpose hereinafter specified.

It further consists in combining with the sides of the horizontally-shaking grate an upper stationary ring, substantially as and for the purpose hereinafter shown.

It further consists in the combination of the horizontally-shaking grate, the inclosing mica section of the casing, and the intervening air-chamber, substantially as and for the purpose hereinafter described.

It further consists in the combination of a fuel-chamber or fire-pot provided with horizontally-shaking sides and vertically-revolving horizontal grate with a surrounding air-chamber, substantially as and for the purpose hereinafter specified.

It further consists in the combination of a magazine, a horizontally-shaking fuel-chamber or fire-pot, and a stationary horizontal supporting grate, substantially as and for the purpose hereinafter set forth.

It further consists in the combination of a descending-flue, situated at the rear of the fuel-chamber or fire-pot within the casing, and with its upper end above the lower end of the magazine, the side bottom flues inclosing the sides of the ash-pit and the ascending-flue, substantially as and for the purpose hereinafter shown.

It further consists in the construction and combination of the various parts of the external casing of the stove, substantially as and for the purpose hereinafter described.

It further consists in the employment of a downward flue having its upper end above the mica windows placed opposite or above the fire, substantially as and for the purpose hereinafter shown.

It further consists in the employment, upon an ash-drawer, of a bail-handle pivoted to or within one end thereof and to or within a cross-bar or brace extending transversely between, and secured to the sides of said drawer, substantially as and for the purpose hereinafter described.

It further consists in the employment of a stop or lug, upon the hereinbefore-named cross-bar or brace, for the purpose of arresting the bail when it has reached a vertical position, substantially as is hereinafter shown It finally consists in the employment of a sliding or swinging end to an ash-drawer, substantially as and for the purpose hereinafter specified.

In the annexed drawing—

A represents the outer casing of the stove, cylindrical in form, and resting upon and secured to a horizontal plate, B, which covers the upper side of the base C.

The upper end of the casing A is covered by means of a top plate, D, to which is attached the upper end of a cylindrical magazine, E, which has a diameter at its point of union with said top plate equal to about two-thirds that of said casing, and from thence tapers slightly to its lower end.

An opening corresponding in size and position with the upper end of the magazine is provided in and through the top plate D, so as to give access to the interior of said magazine.

The height and diameter of the base C are such as to furnish room for the necessary ash-pit F (which may or may not inclose an ash-drawer) and for the side flues G, through which the heated escaping products of combustion from the downward flue pass forward to the front side of said base, said escaping products being divided so as to flow into each of said side flues.

From the forward part of the base C the heated gases may be conducted to the rear of the stove by any of the well-known devices, such as other flues G′ corresponding with and placed immediately beneath the flues G; or, if desired, said flues G and G′ upon either side may be thrown together and said heated gases carried through an additional flue placed beneath the bottom of the base.

At the rear center of the base C is an offset H, that, extending upward and rearward, is provided with an opening at and through the plate B, through which communication is had between the flues G and the back pipe I, and through the latter with the chimney.

Near the upper end of the casing A is a horizontal pipe, K, which connects said casing and the pipe I, and affords direct communication between the interiors of the same.

The peculiar shape of the offset H is given for the purpose of increasing the heating surface of the base, and also to preserve the symmetry of the stove by making the bottom plate B′ circular at its rear; but if desired, said bottom plate and the sides of the base may conform to the shape of the top plate B.

The top B of the base C forms a covering for the whole or a portion of the flues G, and has a horizontally-projecting edge, by means of which the heating surface of said base is largely increased.

A vertical flue, L, is placed within and against the casing A, at its rear side, with its upper end opening into the interior of said casing, above the mica windows and the lower end of the magazine, and its lower end connecting with and opening into the side bottom flues G.

The lower end of the fuel-chamber is formed of a short cylinder or ring, M, loosely secured in vertical and radial position, by any suitable devices, so as to permit of its being rotated in a horizontal plane by means of a rod, *m′*, attached to said ring, and projecting outward to the front.

Attached loosely to the upper edge of the ring M are the lower ends of a series of grate-bars, N, which bars from thence extend upward and outward, and are loosely secured at their opposite ends to or upon a second ring, N′, which passes around and is connected with the interior of the casing A.

As thus arranged, the lower ends of the grate-bars are enabled to conform to the position of the ring M, so that when the latter is partially rotated in either direction a corresponding movement of said bars is produced.

Although the bars N are preferably pivoted upon the ring M, it will be readily seen that the same result would be obtained were they rigidly connected with the latter, in which case their upper ends would move equally with their lower ends.

A supporting grate, O, formed of a solid or partially-open circular plate, having a diameter somewhat less than that of the ring M, is suspended at or immediately beneath the lower edge of the latter, and is made stationary horizontally, and is so constructed as to be capable of a vertically-rotary movement, so as to permit its contents to be dumped.

If desired, a series of ribs, *x′*, may be secured vertically and at equidistant points around the inside of the ring M, for the purpose of more thoroughly agitating the contents of the latter when shaken.

Fire being kindled within the fuel-chamber and the magazine filled with coal, the weight of the column is principally supported upon and by the lower grate, so as to leave the coal around the inner wall of said fuel-chamber comparatively free from pressure and in condition to burn freely.

The air required for the purpose of combustion enters at the lower end of the fuel-chamber as well as through its open sides, until, after two or three days, the ashes, slate, and slag will have accumulated upon the lower grate, so as to close the lower end of said fuel-chamber and compel said air to pass upward around said end and through said open sides, by which means it becomes highly heated, so that when brought in contact with the thin outer stratum of loose coal resting lightly upon or against the sides of the fuel-chamber said coal is caused to burn rapidly and freely.

Of the ashes formed, the principal portion falls through the sides of the fuel-chamber, but by shaking the latter the remainder of said ashes, together with the slate and slag, may be caused to pass through the annular space between its lower end and the edge of the supporting grate, by which means the open sides of said fuel-chamber can at all times be kept free, so as to permit the entire heat of the fire to be radiated outward.

It is found that while a thin layer of coal next to open sides of the fuel-chamber is rapidly consumed, the central portion of the columns burns with extreme slowness, and thus furnishes a certain support to the coal in the magazine, and being heated to a dull red color, said central portion serves as a reservoir of heat, which prevents the fire from going out when the supply of air is cut off.

The position of the back or diving-flue within the outer casing much improves the appearance of the stove, and, being interposed between the fire and the rear side of said stove by the removal of a portion of the fuel-chamber, prevents, in a great degree, the radiation of heat from the rear of said fire, and thus increases the amount of heat thrown off from the front of said stove.

It is intended to insert two rows of mica lights, P and Q, within the casing of the stove; the first row P being placed opposite the fuel-chamber, so as to show the bright under surface of the burning coal; while the second row Q is placed above said chamber and gives a view of the brilliant flame from the gas.

As arranged within the casing, the fuel-chamber divides the interior space into a lower and upper chamber, P′ and Q′, respectively, through each of which heat from the burning fuel is radiated outward through the corresponding mica windows.

The lower chamber also serves as a passage through which air, in a highly-heated state, reaches the burning fuel, and through which ashes passing outward through the sides of the fuel-chamber reach the ash-pit.

The current of air passes inward through the sides of the fuel-chamber at such an angle as to cause the heated escaping products of combustion to pass upward near the magazine until above the upper row of mica windows, by which means said windows are kept clear, after which the current spreads outward against the casing, from thence passes to the rear into and down the diving-flue L, forward through the side bottom flue G into the lower flue G′, or its equivalent, and through the same into and through the back pipe I.

The upper end of the downward flue L is so much above the upper mica windows Q as to cause the ascending current of flame and gas to take the same relative direction whether the direct or downward draught is in use, whereby no greater liability to smoking said windows exists in the latter case than when the direct draught is used.

It will be observed that the sides of the fuel-chamber are composed of separate bars, so connected together at their lower ends as to allow of the longitudinal expansion and contraction of each without interfering with their position or with that of other portions of said fuel-chamber, and that when burned out said bars may be removed and others substituted at a slight expenditure of time and money; but if desired said bars may be cast with and form a part of the rings M and *n*, in which event their operation would be the same and like object obtained, said object being to drive air through the sides of the fuel-chamber instead of through the lower grate and center of the fire, and to keep the fire at the sides of said fuel-chamber free from ashes, so as to cause at that point the rapid combustion of a thin layer of coal.

The casing of the stove is composed of the projecting bottom plate B′, the side C, the projecting base top B extending inward beyond said side, the solid cylinder A′, which may be vertical, the lower and upper sections of mica windows P and Q, respectively, separated by a short solid strip, *p*, against which the upper edge of the fuel-chamber rests, so as to divide horizontally the space within said mica sections into two distinct chambers, P′ and Q′.

Above said section Q is a straight cylinder, A, and a top plate, D, of usual construction.

Figure 3:
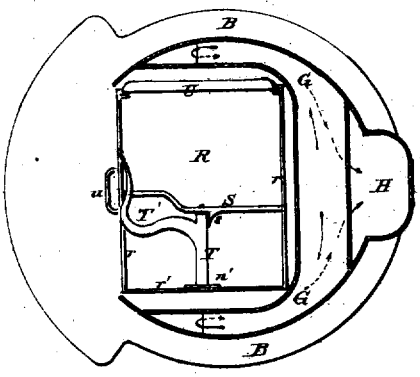
Figure 4:
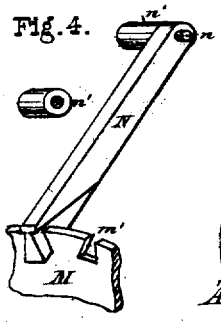
Figure 4 is a perspective view of one of the grate-bars, showing its manner of attachment.
Figure 6:
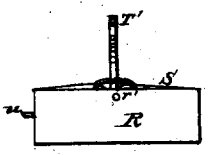
Figures 6 and 7 are end elevations of the ash-drawer.
Figure 5:
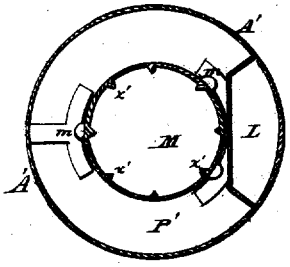
Figure 5 is a plan view of the fuel-chamber, showing the means employed for suspending the same.
Figure 8:
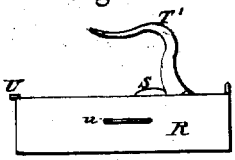
Figure 8 is a side elevation of the same.
Figure 7:
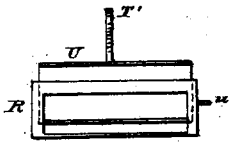

The ash-drawer R, shown in figs. 3, 6, 7, and 8, has the usual rectangular form, and corresponds in size with the interior of the ash-pit.

Secured to and extending between the upper edges of the sides *r* is a cross-bar, S, which serves as a bearing for one end of the short shaft T, the opposite end of which is pivoted within the end *r′* of the drawer.

An arm, T′, extending outward and forward from the shaft T, and forming a part of the same, furnishes a handle by means of which the drawer is lifted, which handle when in use assumes a vertical position, and at other times turns downward and rests upon the upper edge of the drawer.

A lug, *s*, is provided upon the side of the cross-bar S, and so adjusted as to arrest said handle when it has attained the desired angle, and thus prevent it from passing beyond a perpendicular line.

The forward end of the ash-drawer is provided with a slide, U, which may be raised so as to permit the ashes to slide out; but if desired said end may be pivoted so as to swing outward when the drawer is lifted up.

A handle, *u*, provided upon the front of the ash-drawer, and another, *u′*, upon its end, completes the device, the operation of which is as follows:

The drawer, being removed from the stove, is lifted by means of the handle with one hand, while with the other the slide at the end is raised, so that, by elevating the opposite end, the ashes will be caused to pass out of the drawer beneath said slide, by which means all soiling of the hands is prevented and much of the usual annoyance incident to the employment of ash-drawers of usual construction is avoided.

From the peculiar construction of the handle, and from the manner in which it is connected with the drawer, no obstruction is caused to the free passage of the ashes from the latter, and much less dust is consequently raised than would otherwise be the case.

Having thus fully set forth the nature and merits of my invention,

What I claim as new is—

1. A fuel-chamber or fire-pot having grated sides N, a solid ring, M, at its lower end, and a horizontal grate, O, placed within or immedediately beneath the latter, when said chamber is capable of being shaken independent of said grate O, substantially as and for the purpose specified.

2. A fuel-chamber or fire-pot having its sides composed of a series of bars so pivoted at their ends as to permit the sides of said chamber to move in a horizontal plane, substantially as and for the purpose set forth.

3. A circular basket-grate having its rear side closed or occupied by a flue, so as thereby to cause a greater consumption of fuel and radiation of heat from the front side than from its rear side, substantially as shown.

4. A fuel-chamber composed of a basket-grate, N, a horizontal grate, O, and a solid ring, M, when the latter is arranged with reference to said grate O, substantially as and for the purpose specified.

5. In combination with the bars N, the ring M, attached to and connecting together their lower ends, substantially as shown and described.

6. The means employed for giving to the bars N a reciprocating lateral movement, consisting of the ring M, connected with the lower ends of said bars and resting within or upon suitable supports, so as to be capable of a semi-rotary motion horizontally, substantially as specified.

7. In combination with the horizontally-moving ring M, the vertically-revolving grate O, substantially as and for the purpose set forth.

8. In combination with the shaking-grate N, the stationary ring N′, substantially as and for the purpose described.

9. In combination with the shaking-grate N, constructed as described, the mica section P and the chamber P′, substantially as and for the purpose shown.

10. The air-passage P′, in combination with the fuel-chamber, composed of the shaking side grate N, the rings M and N′, and the grate O, substantially as and for the purpose specified.

11. In combination with the magazine E, the horizontally-shaking grate N and the stationary grate O, substantially as shown and for the purpose set forth.

12. The descending-flue L, situated at the rear of the fuel-chamber within the casing, and with its upper end above the lower end of the magazine, the side bottom flues G connected with said flue L, and inclosing the sides of the ash-pit, and the ascending-flue I placed parallel with but separate from said flue L, when constructed and combined substantially as and for the purpose specified.

13. The straight upper section A, inclosed at its upper end by the top plate D, the mica sections P and Q separated by the solid strip *p*, the solid cylinder A, the projecting upper and lower plates B and B′, respectively, and the side C, when inclosing and combined with the fire-chamber, exit and base flues, substantially as and for the purpose specified.

14. A downward flue having its upper end above the mica windows placed opposite or above the fire, so as to cause the heated escaping products of combustion to take the same upward direction whether the direct or downward draught is used, substantially as shown, and for the purpose described.

15. The handle T, pivoted within the end *r'* of the drawer R, and within the cross-bar S, extending transversely across said drawer, substantially as shown, and for the purpose described.

16. The employment of a sliding or swinging end to an ash-drawer, substantially as shown, and for the purpose specified.

In testimony that I claim the foregoing I have hereunto set my hand this 18th day of January, 1871.

Witnesses: WILLIAM J. KEEP.

R. S. HENDERSON,

B. MACGREGOR.